(12) United States Patent
Foo et al.

(10) Patent No.: US 8,357,764 B2
(45) Date of Patent: Jan. 22, 2013

(54) FAST CURABLE EPOXY COMPOSITIONS CONTAINING IMIDAZOLE- AND 1-(AMINOALKYL) IMIDAZOLE-ISOCYANATE ADDUCTS

(75) Inventors: Maw Lin Foo, Berkeley, CA (US); Gamini Ananda Vedage, Bethlehem, PA (US); Atteye Houssein Abdourazak, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 221 days.

(21) Appl. No.: 12/609,068

(22) Filed: Oct. 30, 2009

(65) Prior Publication Data
US 2010/0280211 A1    Nov. 4, 2010

Related U.S. Application Data

(63) Continuation-in-part of application No. 12/432,095, filed on Apr. 29, 2009, now abandoned.

(51) Int. Cl.
  C08F 283/10    (2006.01)
  C08G 59/14    (2006.01)
  C08G 18/10    (2006.01)
  C08L 63/00    (2006.01)
(52) U.S. Cl. .......... 525/528; 252/182.2; 528/59
(58) Field of Classification Search .......... 525/528
See application file for complete search history.

(56) References Cited

U.S. PATENT DOCUMENTS

| | | | |
|---|---|---|---|
| 4,533,715 A | 8/1985 | Lee et al. | |
| 4,797,455 A * | 1/1989 | Lin et al. | 525/504 |
| 5,599,855 A | 2/1997 | Walker | |
| 6,812,269 B2 * | 11/2004 | Koenraadt et al. | 523/336 |

FOREIGN PATENT DOCUMENTS

| | | |
|---|---|---|
| JP | 59-227925 | 12/1984 |
| JP | 63-178125 | 7/1988 |
| JP | 63-223027 | 9/1988 |
| JP | 64-066172 | 3/1989 |
| JP | 04-314724 | 11/1992 |
| JP | 06184274 A * | 7/1994 |
| JP | 2000-290257 | 10/2000 |
| JP | 2000-290260 A | 10/2000 |
| JP | 2001-152083 A | 6/2001 |
| JP | 2001152083 A * | 6/2001 |

OTHER PUBLICATIONS

English machine translation of JP 2001-152083 A, Onishi et al, Jun. 5, 2001.*
Computer generated English translation of JP 06-184274 A, Jul. 5, 1994, Kubota et al.*

* cited by examiner

*Primary Examiner* — Peter F Godenschwager
*Assistant Examiner* — David Karst
(74) *Attorney, Agent, or Firm* — Michael K. Boyer (57) ABSTRACT

Epoxy curing agents comprising imidazole-isocyanate adducts, including 1-(aminoalkyl)imidazole-isocyanate adducts and especially 1-(3-aminopropyl)imidazole-isocyanate adducts, and their use as curing agents in heat curable one-component epoxy resin compositions. Epoxy curing agents comprising imidazole-isocyanate adducts comprising the reaction product of at least one imidazole, at least one polyisocyanate and at least one diamine.

11 Claims, 9 Drawing Sheets

Example A

Figure 1: Example A

Figure 2: Example B

Figure 3: Example C

Figure 4: Example D

Figure 5: Example E

Figure 6: Example F

Figure 7: Example G

Figure 9: Example I

FAST CURABLE EPOXY COMPOSITIONS CONTAINING IMIDAZOLE- AND 1-(AMINOALKYL) IMIDAZOLE-ISOCYANATE ADDUCTS

CROSS-REFERENCE TO RELATED APPLICATIONS

This application is a continuation in part of U.S. application Ser. No. 12/432,095, filed on Apr. 29, 2009. The disclosure of application Ser. No. 12/432,095 is hereby incorporated by reference.

BACKGROUND OF THE INVENTION

Epoxy based adhesives are used in various applications in automotive, electronics, aerospace and the general industries. They are increasingly replacing conventional bonding systems such as soldering, welding, rivets, nails, screws and bolts because of the benefits they provide over these systems. Some of these benefits include bonding similar and dissimilar substrates without damaging them, better distribution of stress over wide area, better fatigue resistance and noise and vibration resistance. In certain applications in automotive and in electronics, a fast curing (or snap-cure) adhesive system is highly desirable for cycle time reduction and cost savings.

A one-component epoxy based adhesive system is preferred over a two-components system because it eliminates the mixing step, the required time to apply it, and the cooling during storage and shipping associated with the two-components system. An example of a one-component system is described in U.S. Pat. No. 4,797,455; hereby incorporated by reference.

The present invention relates to latent curing agents for epoxy resins including 100% solids epoxy compositions and water-based compositions, especially one-component 100% solids epoxy compositions. "Latent" curing agents are those curatives that in a formulated epoxy system remain inactive under normal ambient conditions but react readily with the epoxy resin at elevated temperatures. "One component" epoxy compositions are typically a blend of an epoxy resin, a curing agent and optionally an accelerator as well as additives and fillers.

BRIEF SUMMARY OF THE INVENTION

The present invention provides imidazole-isocyanate adducts comprising the reaction products of an imidazole with a polymethylene diisocyanate having 2-8 methylene units or with a polymethylene poly(phenylisocyanate) having an isocyanate functionality of 2.1-3.5 and their use as epoxy curing agents, namely latent curing agents, in heat curable one-component epoxy resin compositions. One-component epoxy resin compositions comprise the contact product of a latent curing agent of this invention, optionally but preferably an accelerator for the curing agent, and an epoxy resin.

In one aspect of the present invention the imidazole-isocyanate adducts are 1-(aminoalkyl)imidazole-isocyanate adducts and in another aspect the imidazole-isocyanate adducts are 1-(3-aminopropyl)imidazole adducts.

The present invention also provides imidazole-isocyanate and 1-(aminoalkyl)imidazole-isocyanate adducts comprising the reaction products of imidazole and 1-(aminoalkyl)imidazole with a polymethylene diisocyanate such as hexamethylene diisocyanate and with polymethylene poly(phenylisocyanate) having an isocyanate functionality of 2.1-3.5 and their use as epoxy curing agents having a fast cure (or snap-cure) at low and high temperature, respectively, as sole, latent curing agents in heat curable one-component epoxy resin compositions.

In one aspect the present invention provides 1-(3-aminopropyl)imidazole-isocyanate adducts comprising the reaction products of 1-(3-aminopropyl)-imidazole with a polymethylene diisocyanate such as hexamethylene diisocyanate and with polymethylene poly(phenylisocyanate) having an isocyanate functionality of 2.1-3.5 as the 1-(aminoalkyl)imidazole-isocyanate adduct curing agents.

In another aspect of the invention the one-component epoxy resin composition comprises a 1-(aminoalkyl)imidazole-isocyanate adduct and an epoxy resin.

In one aspect the invention is directed to imidazole-isocyanate adducts as epoxy curing agents and their use in one-component heat curable epoxy compositions, such as 100% solids compositions and water-based compositions. In another aspect the invention is directed to 1-(aminoalkyl) imidazole-isocyanate adducts as epoxy curing agents and their use in one-component heat curable epoxy compositions, such as 100% solids compositions and water-based compositions.

In all aspects of the invention as stated herein the imidazole-isocyanate adducts may be 1-(aminoalkyl)imidazole-isocyanate adducts and in all aspects the imidazole-isocyanate adducts may be 1-(3-aminopropyl)imidazole-isocyanate adducts. These adducts are prepared by reacting the imidazole with a polymethylene diisocyanate or with a polymethylene poly(phenylisocyanate) having an isocyanate functionality of 2.1-3.5.

In a further aspect of the invention the imidazole-isocyanate adducts are represented by formula A:

where Z is $(CH_2)_n$—NH, p is 0-1 and n is 3-8, R is $(CH_2)_m$ and m is 2-8 or the polyvalent residue of polymethylene poly(phenylisocyanate) having an isocyanate functionality of 2.1-3.5; and $R_1$ and $R_2$ independently represent hydrogen, C1-C20 linear or branched alkyl, C6-C10 aryl, alkylaryl or arylalkyl; or C5-C6 cycloaliphatic.

In a yet further aspect of the invention the imidazole-isocyanate adducts are represented by formula B:

where Z is $(CH_2)_n$—NH, p is 0-1 and n is 3-8, $R_1$ and $R_2$ independently represent hydrogen, C1-C20 linear or branched alkyl, C6-C10 aryl, alkylaryl or arylalkyl; or C5-C6 cycloaliphatic; and m is 2-8.

The present invention also provides imidazole-isocyanate adducts comprising the reaction products of at least one imidazole, at least one isocyanate and at least one diamine, and their use as an epoxy curing agent, namely latent curing agents, in heat curable epoxy resin compositions. Examples of suitable diamines comprise linear or branched alkyldiamines such as ethylenediamine, hexanediamine, butanediamines, octamethylenediamine, 1,2-diaminopropane, trimethyl hexamethylene diamine; cycloaliphatic diamines such as isophorone diamine, 1,2-diaminocyclohexane, bis-(4-aminocyclohexyl)methane, bis-amino(4-amino-3-methylcylohexyl)methane; arylaliphatic diamines such as xylenediamine; aromatic diamines such as phenylene diamines, toluene diamine, diaminopyridine, dianiside diaminodiphenyl methane, diethyltoluenediamine, diaminodiphenylsulphone; ether and polyetheramines such as diaminophenyl ether, triethyleneglycoldiamine and alpha-(2-aminomethylethyl)omega-(2-aminomethylethoxy) and mixtures thereof. In the case of a one-component epoxy resin compositions, the compositions comprise the contact product of a latent curing agent of this invention, optionally, an accelerator for the curing agent, and an epoxy resin.

In another aspect of the invention, the imidazole-isocyanate adducts are represented by the following formula:

wherein x=0-10, n is 3-8, m is 2-8, l is 2-10 and R1 and R2 independently represent hydrogen, C1-C20 linear or branched alkyl, C6-C10 aryl, alkylaryl or arylalkyl; or C5-C6 cycloaliphatic.

In another aspect of the invention, the imidazole-isocyanate adducts are represented by formula:

wherein x=0-10, n is 3-8, l is 2-10, R is $(CH_2)_m$ and m is 2-8 or the polyvalent residue of polymethylene poly(phenylisocyanate) having an isocyanate functionality of 2.1-3.5; and R1 and R2 independently represent hydrogen, C1-C20 linear or branched alkyl, C6-C10 aryl, alkylaryl or arylalkyl; or C5-C6 cycloaliphatic.

In another aspect of the invention, the imidazole-isocyanate adducts are represented by formula:

wherein x=0-10, y=0-10, l is 2-10, m is 2-8 n is 3-8, q is 2-10, and R1 and R2 independently represent hydrogen, C1-C20 linear or branched alkyl, C6-C10 aryl, alkylaryl or arylalkyl; or C5-C6 cycloaliphatic.

In a further aspect of the invention, the imidazole-isocyanate adducts are represented by formula:

$Z = (CH_2)_n - NH \quad p = 0-1$ wherein x=0-10, y=0-1, n is 3-8, q is -2-10, R is $(CH_2)_m$ and m is 2-8 or the polyvalent residue of polymethylene poly(phenylisocyanate) having an isocyanate functionality of 2.1-3.5; and R1 and R2 independently represent hydrogen, C1-C20 linear or branched alkyl, C6-C10 aryl, alkylaryl or arylalkyl; or C5-C6 cycloaliphatic.

Every aspect and every embodiment of the invention as disclosed herein is meant to be combined with all the other disclosed aspects and embodiments of the invention individually and in all possible combinations thereof.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or epoxy formulations described herein. In addition, in contacting the components together two or more of the components may react to form other components.

DETAILED DESCRIPTION OF THE INVENTION

The invention relates to imidazole-isocyanate adducts, including 1-(aminoalkyl)imidazole-isocyanate adducts and especially 1-(3-aminopropyl)imidazole-isocyanate adducts, and their use as curing agents in curing epoxy resin compositions. The invention also relates to imidazole-isocyanate adducts obtained by contacting at least one imidazole, at least one isocyanate and at least one diamine, and their use as curing agents in curing epoxy resin compositions.

Among the various aspects of the invention are the following:

a curing agent for heat cured one-component epoxy compositions.

one-component 100% solids epoxy compositions comprising an imidazole-isocyanate adduct, optionally an accelerator, and an epoxy resin which offer low-temperature and/or high temperature cure and shelf stability.

one-component water based epoxy compositions comprising an imidazole-isocyanate adducts, optionally an accelerator, and an epoxy resin which offer low-temperature and/or high temperature cure and shelf stability.

The fast cure, or snap cure, attribute of the imidazole-isocyanate adducts according to the invention is determined by measuring the cure profile by differential scanning calorimeter (DSC) of the imidazole-isocyanate adducts as epoxy curing agents in an epoxy formulation comprising a polyglycidyl ether of Bisphenol A resin (Epon 828) and 10 phr (wt parts per 100 parts resin) of the curing agent. The resulting mixture is blended thoroughly for 2 minutes using a high sheer cowls blade mixer. Immediately after preparation the mixture is examined by DSC to determine the beginning (Ti) and end (Tf) of the exotherm. The DSC analysis is performed using a 10° C./min ramp heat rate on about a 10 to 15 mg sample of material. For a fast cure according to the invention the value of Tf-Ti is less than about 70° C. in one aspect, less than about 60° C. in another aspect and less than 50° C. in a preferred aspect.

In an aspect of the invention the imidazole-isocyanate adducts are represented by formula A:

where Z is $(CH_2)_n$—NH, p is 0-1 and n is 3-8, R is $(CH_2)_m$ and m is 2-8 or the polyvalent residue of polymethylene poly(phenylisocyanate) having an isocyanate functionality of 2.1-3.5; and $R_1$ and $R_2$ independently represent hydrogen, C1-C20 linear or branched alkyl, C6-C10 aryl, alkylaryl or arylalkyl; or C5-C6 cycloaliphatic.

In another aspect of the invention the imidazole-isocyanate adducts are represented by formula B:

where Z is $(CH_2)_n$—NH, p is 0-1 and n is 3-8, $R_1$ and $R_2$ independently represent hydrogen, C1-C20 linear or branched alkyl, C6-C10 aryl, alkylaryl or arylalkyl; or C5-C6 cycloaliphatic; and m is 2-8.

As one aspect of the invention the 1-(aminoalkyl)imidazole-isocyanate adducts for use in epoxy formulations are represented by formula C:

where R is $(CH_2)_m$ and m is 2-8 or the divalent residue of polymethylene poly(phenylisocyanate) having an isocyanate functionality of 2.1-3.5; $R_1$ and $R_2$ independently represent hydrogen, C1-C20 linear or branched alkyl, C6-C10 aryl, alkylaryl or arylalkyl; or C5-C6 cycloaliphatic; and n is 3-8.

In a further aspect of the invention the 1-(3-aminopropyl) imidazole-isocyanate adducts are represented by formula D:

where $R_1$ and $R_2$ independently represent hydrogen, C1-C20 linear or branched alkyl, C6-C10 aryl, alkylaryl or arylalkyl; or C5-C6 cycloaliphatic; m is 2-8 and n is 3.

In other aspects of the foregoing aspects and embodiments, independently or in combination m is 3-6 and n is 3-6.

For other aspects of all of the foregoing aspects and embodiments, R represents butanediyl, hexanediyl, octanediyl or the polyvalent residue from polymethylene poly(phenylisocyanate) having an isocyanate functionality of 2.1-3.5; and $R_1$ and $R_2$ substituents are selected individually or in any combination from the group consisting of representing hydrogen, C1-C4 linear or branched alkyl, C6-C8 aryl, alkylaryl or arylalkyl, especially hydrogen, methyl and ethyl.

Yet in other aspects of each of the foregoing aspects and embodiments, R represents hexanediyl or the polyvalent residue from polymethylene poly(phenylisocyanate) having an isocyanate functionality of 2.1-3.5; and $R_1$ and $R_2$ substituents are selected individually or in any combination from the group consisting of hydrogen, C1-C4 linear or branched alkyl, C6-C8 aryl, alkylaryl or arylalkyl, especially hydrogen, methyl and ethyl.

Suitable alkyl groups include, for example, methyl, ethyl, n- and isopropyl, n-, iso-, sec- and tert-butyl, 2-ethyhexyl, octyl, decyl, dodecyl and heptadecyl. Suitable aryl groups include phenyl and naphthyl. Suitable arylalkyl group include benzyl and phenyl ethyl. Suitable alkylaryl groups include tolyl, xylyl and ethylphenyl. Suitable C5-C6 cycloaliphatic groups include cyclopentyl and cyclohexyl.

In other embodiments of the various aspects of the invention, $R_1$ and $R_2$ independently represent hydrogen, methyl, ethyl, linear or branched propyl or butyl, benzyl, phenylethyl, cyclopentyl and cyclohexyl. In other embodiments of the various aspects of the invention, $R_1$ and $R_2$ independently represent hydrogen, methyl, or ethyl. In other embodiments of the various aspects of the invention, $R_1$ and $R_2$ represent hydrogen.

In another aspect of the invention, the imidazole-isocyanate adducts are represented by the following formula E:

$Z = (CH_2)_n$—NH  p = 0-1 wherein x=0-10, n is 3-8, m is 2-8, l is 2-10, and R1 and R2 independently represent hydrogen, C1-C20 linear or branched alkyl, C6-C10 aryl, alkylaryl or arylalkyl; or C5-C6 cycloaliphatic

In another aspect of the invention, the imidazole-isocyanate adducts are represented by formula F:

$Z = (CH_2)_n - NH \quad p = 0-1$ wherein x=0-10, n is 3-8, l is 2-10, R is $(CH_2)_m$ and m is 2-8 or the polyvalent residue of polymethylene poly(phenylisocyanate) having an isocyanate functionality of 2.1-3.5; and R1 and R2 independently represent hydrogen, C1-C20 linear or branched alkyl, C6-C10 aryl, alkylaryl or arylalkyl; or C5-C6 cycloaliphatic.

In another aspect of the invention, the imidazole-isocyanate adducts are represented by formula G:

$Z = (CH_2)_n - NH \quad p = 0-1$ wherein x=0-10, y=0-10, l is 2-10, m is −2-8 n is 3-8, q is 2-10, and R1 and R2 independently represent hydrogen, C1-C20 linear or branched alkyl, C6-C10 aryl, alkylaryl or arylalkyl; or C5-C6 cycloaliphatic

In a further aspect of the invention, the imidazole-isocyanate adducts are represented by formula H:

wherein x=0-10, y=0-1, l is 2-10, n is 3-8, q is 2-10, R is $(CH_2)$, and m is 2-8 or the polyvalent residue of polymethylene poly(phenylisocyanate) having an isocyanate functionality of 2.1-3.5; and R1 and R2 independently represent hydrogen, C1-C20 linear or branched alkyl, C6-C10 aryl, alkylaryl or arylalkyl; or C5-C6 cycloaliphatic In one aspect of R in the above formulas, R is a C3-C8 alkanediyl.

In another aspect of R in the above formulas, R is the polyvalent residue of polymethylene poly(phenylisocyanate) having an isocyanate functionality of 2.1-3.5, the isocyanate functionalities having reacted with the nitrogen atom of the imidazoles to afford urea functionalities.

Every aspect and every embodiment of the invention as disclosed herein is meant to be combined with all the other disclosed aspects and embodiments of the invention individually and in all possible combinations thereof. Such combinations would be apparent to a skilled worker in the art from the present description of the invention.

$Z = (CH_2)_n - NH \quad p = 0-1$

The imidazole-isocyanate adducts including the 1-(aminoalkyl)imidazole-isocyanate adducts and especially the 1-(3-aminopropyl)imidazole-isocyanate adducts, can be prepared by reactions well known to a chemist and are reported in the literature such as U.S. Pat. No. 4,797,455 or by reacting an appropriate imidazole with the appropriate polyisocyanate, i.e., polymethylene diisocyanate or polymethylene poly (phenylisocyanate), in a polar organic solvent such as acetonitrile. Imidazoles and isocyanates suitable for use in making the adducts are commercially available. Imidazoles and isocyanates are available from Sigma-Aldrich.

In an aspect of the invention suitable imidazole-isocyanate adducts include adducts of tetramethylene diisocyanate, pentamethylene diisocyanate, hexamethylene diisocyanate, octamethylene diisocyanate, and polymethylene poly(phenylisocyanate) with imidazoles such as imidazole, 2-ethyl imidazole, 2-methyl imidazole, 2-propyl imidazole, 2-undecyl imidazole, 2-phenyl imidazole, 2-isopropyl imidazole, 2-ethyl-4-methyl imidazole, 2-phenyl-4-methyl imidazole and 1-(aminoalkyl)imidazoles such as 2-methyl-1-(3-aminopropyl)imidazole, 2-ethyl-1-(3-aminopropyl)imidazole, 2-phenyl-1-(3-aminopropyl)imidazole, 2-ethyl-4-methyl-1-(3-aminopropyl)imidazole. The preferred imidazole-isocyanate adducts include imidazole and 2-ethyl-4-methyl imidazole-hexamethylene diisocyanate and polymethylene poly (phenylisocyanate) adducts, 1-(3-aminopropyl)imidazole-hexamethylene diisocyanate adduct and 1-(3-aminopropyl) imidazole-polymethylene poly(phenylisocyanate) adduct.

In an aspect of the invention that employs a reaction product including at least one diamine, examples of suitable diamines comprise at least one member selected from the group consisting of linear or branched alkyldiamines such as ethylenediamine, hexanediamine, butanediamines, octamethylenediamine, 1,2-diaminopropane, trimethyl hexamethylene diamine; cycloaliphatic diamines such isophorone diamine, 1,2-diaminocyclohexane, bis-(4-aminocyclohexyl) methane, bis-amino(4-amino-3-methylcyclohexyl)methane; arylaliphatic diamines such as xylenediamine; aromatic diamines such as phenylene diamines, toluene diamine, diaminopyridine, dianiside diaminodiphenyl-methane, diethyltoluenediamine, diaminodiphenylsulphone; ether and polyetheramines such as diaminophenyl ether, triethyleneglycoldiamine and alpha-(2-aminomethylethyl)omega-(2-aminomethylethoxy) and mixtures thereof. Such diamines are commercially available from various suppliers including Air Products and Chemicals, Inc, Huntsman, BASF, Bayer, Mitsubishi, Evonik. The ratio of imidazole plus diamine to polyisocyanate is typically 1:0.5 to 1:1.5, preferably 0.9:1.1. The ratio of imidazole to diamine is typically 10:1 to 1:10 preferably 4:1. The imidazole-isocyanate adducts can be used as epoxy curing agents in one-component epoxy compositions such as adhesives, decorative and protective coatings including powder coatings, filament winding, printed circuit board and other epoxy applications. Typically, 0.5 to 10 parts by weight (pbw) imidazole-isocyanate adduct are used in the epoxy composition per 100 pbw epoxy resin, preferably 2 to 6 pbw of imidazole-isocyanate adduct per 100 pbw epoxy resin.

The imidazole-isocyanate adduct epoxy curing agent is combined with an epoxy resin which is a polyepoxy compound containing more than one 1,2-epoxy groups per molecule. Such epoxides are well known in the epoxy art and are described in Y. Tanaka, "Synthesis and Characteristics of Epoxides", in C. A. May, ed., Epoxy Resins Chemistry and Technology, pages 9-289 (Marcel Dekker, 1988). Examples include those epoxides disclosed in U.S. Pat. No. 5,599,855 (Col 5/6 to 6/20), which is incorporated by reference. The preferred polyepoxy compounds are the diglycidyl ethers of bisphenol-A, the advanced diglycidyl ethers of bisphenol-A, the diglycidyl ethers of bisphenol-F, and the epoxy novolac resins. Both liquid epoxy resins and solid epoxy resins are suitably used in the one component epoxy compositions. Powder coating compositions would comprise a solid epoxy resin and an imidazole-isocyanate adduct and, optionally, an accelerator.

Epoxy compositions prepared from imidazole-isocyanate adducts can be formulated with a wide variety of ingredients well known to those skilled in the art of coating formulation, including solvents, fillers, pigments, pigment dispersing agents, rheology modifiers, thixotropes, flow and leveling aids, and defoamers.

While one component epoxy compositions comprising 1 to 90 wt % organic solvents, or 100 wt % solids epoxy compositions, or water-based, i.e., aqueous, epoxy compositions containing 20 to 80 wt % solids can be used, it is preferred the epoxy composition be 100 wt % solids.

The epoxy compositions of this invention can be applied as coatings by any number of techniques including spray, brush, roller, paint mitt, and the like. Numerous substrates are suitable for application of coatings of this invention with proper surface preparation, as is well understood in the art. Such substrates include but are not limited to many types of metal, particularly steel and aluminum, as well as concrete.

One component epoxy compositions of this invention can be cured at elevated temperatures ranging from about 80° C. to about 240° C., with cure temperatures of 120° C. to 160° C. preferred.

EXAMPLES A-I

Example A

Into a three neck flask on a heating mantle fitted a with condenser, a dropping funnel and thermocouple was charge 50 g (0.4 mole) of 1-(3-aminopropyl)imidazole and 250 ml of acetonitrile and heated to 70-80° C. To the stirred solution was added drop wise 33.6 g (0.2 mole) of hexamethylene diisocyanate dissolved in 50 ml of acetonitrile. White precipitate formed. After the addition the mixture was stirred at 70-80° C. for an hour then cooled to ambient temperature. The white solid was filtered and washed with acetonitrile.

Example B 1-(3-aminopropyl)imidazole (63 g; 0.5 mole) and polymethylene polyphenylisocyanate (82.9 g; 0.3 mole) were reacted following the procedure of Example A. The 1-(3-aminopropyl)imidazole-polymethylene polyphenylisocyanate adduct was obtained as a solid product.

Example C 1-(3-aminopropyl)imidazole (62.59 g; 0.5 mole) and phenylisocyanate (59.5 g; 0.5 mole) were reacted following the procedure of Example A. The 1-(3-aminopropyl)imidazole-phenylisocyanate adduct was obtained as a solid product.

Example D 1-(3-aminopropyl)imidazole (30 g; 0.24 mole) and cyclohexylisocyanate (30 g; 0.24 mole) were reacted following the procedure of Example A. The 1-(3-aminopropyl)imidazole-cyclohexylisocyanate adduct was obtained as a viscous clear yellow product.

Example E 1-(3-aminopropyl)imidazole (63 g; 0.5 mole) and toluene diisocyanate (46.1 g; 0.26 mole) were reacted following the procedure of Example A. The 1-(3-aminopropyl)imidazole-toluene diisocyanate adduct was obtained as a solid product.

Example F

2-Ethyl-4-methyl imidazole (22 g; 0.2 mole) and hexamethylene diisocyanate (16.8 g; 0.1 mole) were reacted following the procedure of Example A. The 2-ethyl-4-methyl imidazole-hexamethylene diisocyanate adduct was obtained as a solid product.

Example G

Imidazole (13.2 g; 0.2 mole) and hexamethylene diisocyanate (16.8 g; 0.1 mole) were reacted following the procedure of Example A. The imidazole-hexamethylene diisocyanate adduct was obtained as a solid product.

Example H 1-(3-aminopropyl)imidazole (312 g; 2.5 moles), 1,6-hexanediamine (63 g; 0.54 mole) and hexamethylene diisocyanate (300 g; 1.78 moles) were reacted following the procedure of Example A. The 1-(3-aminopropyl)imidazole-1,6-hexanediamine-hexamethylene diisocyanate adduct was obtained as a solid product. Table 1 shows the Matrix-assisted laser desorption/ionization (MALDI) mass spectrometry (MS) analysis of the components distribution.

TABLE 1

Components distribution (A = 1-(3-aminopropyl) imidazole; B = hexamethylene diisocyanate; C = 1,6-hexanediamine)

| Product | % |
|---|---|
| A-B-A | 49 |
| A-B-C-B-A | 21 |
| A-B-C-B-C-B-A | 15 |
| A-B-C-B-C-B-C-B-A | 7 |
| A-B-C-B-C-B-C-B-C-B-A | 5 |
| A-B-C-B-C-B-C-B-C-B-C-B-A | 3 |

Example I 1-(3-aminopropyl)imidazole (261 g; 2.09 moles), 1,6-hexanediamine (39 g; 0.34 mole), 1,4-butanediamine (9.9 g; 0.11 mole) and hexamethylene diisocyanate (250 g; 1.49 moles) were reacted following the procedure of Example A. The 1-(3-aminopropyl)imidazole-1,6-hexanediamine-1,4-butanediamine-hexamethylene diisocyanate adduct was obtained as a solid product. Table 2 shows the Matrix-assisted laser desorption/ionization (MALDI) mass spectrometry (MS) analysis of the components distribution.

TABLE 2

Components distribution (A = 1-(3-aminopropyl) imidazole; B = hexamethylene diisocyanate; C = 1,6-hexanediamine; D = 1,4-butanediamine)

| Product | % |
|---|---|
| A-B-A | 42.0 |
| A-B-D-B-A | 7.1 |
| A-B-C-B-A | 23.8 |
| A-B-D-B-D-B-A | 0.5 |
| A-B-C-B-D-B-A | 6.4 |
| A-B-C-B-C-A | 10.4 |
| A-B-C-B-D-B-D-A | 0.6 |
| A-B-C-B-C-B-D-A | 3.3 |
| A-B-C-B-C-B-C-A | 3.6 |
| A-B-C-B-C-D-B-D-B-A | 0.4 |
| A-B-C-B-C-B-C-D-B-A | 1.1 |
| A-B-C-B-C-B-C-B-C-A | 0.7 |
| A-B-C-B-C-B-C-B-C-D-B-A | 0.1 |

The imidazole-isocyanate adducts of Examples A-I were screened by differential scanning calorimeter (DSC) for their cure profile as epoxy curing agents. The epoxy formulation comprised polyglycidyl ether of Bisphenol A resin (Epon 828) and 10 phr (wt parts per 100 parts resin) of the curing agent. The resulting mixtures were blended thoroughly for 2 minutes using a high sheer cowls blade mixer. Immediately after preparation the mixtures were examined by DSC to determine the onset temperature (To), the heat of reaction ($\Delta H$), the maximum exotherm (Tmax), the beginning (Ti) and end (Tf) of the exotherm. The DSC analysis was performed using a 10° C./min ramp heat rate on about a 10 to 15 mg sample of material. The resulting data is shown in Table 3.

TABLE 3

| Example | $T_O$ (° C.) | $T_{max}$ (° C.) | $T_i$ (° C.) | $T_f$ (° C.) | $T_f - T_i$ (° C.) | $\Delta H$ (J/g) |
|---|---|---|---|---|---|---|
| A | 129 | 140 | 121 | 156 | 35 | 419 |
| B | 181 | 190 | 162 | 220 | 58 | 368 |
| C | 110 | 127 | 97 | 187 | 90 | 352 |
| D | 84 | 106 | 49 | 182 | 133 | 288 |
| E | 117 | 138 | 96 | 229 | 133 | 412 |
| F | 127 | 135 | 100 | 169 | 69 | 485 |
| G | 124 | 137 | 98 | 165 | 67 | 513 |
| H | 121 | 141 | 113 | 181 | 68 | 303 |
| I | 119 | 139 | 116 | 177 | 61 | 381 |

Figure 1:
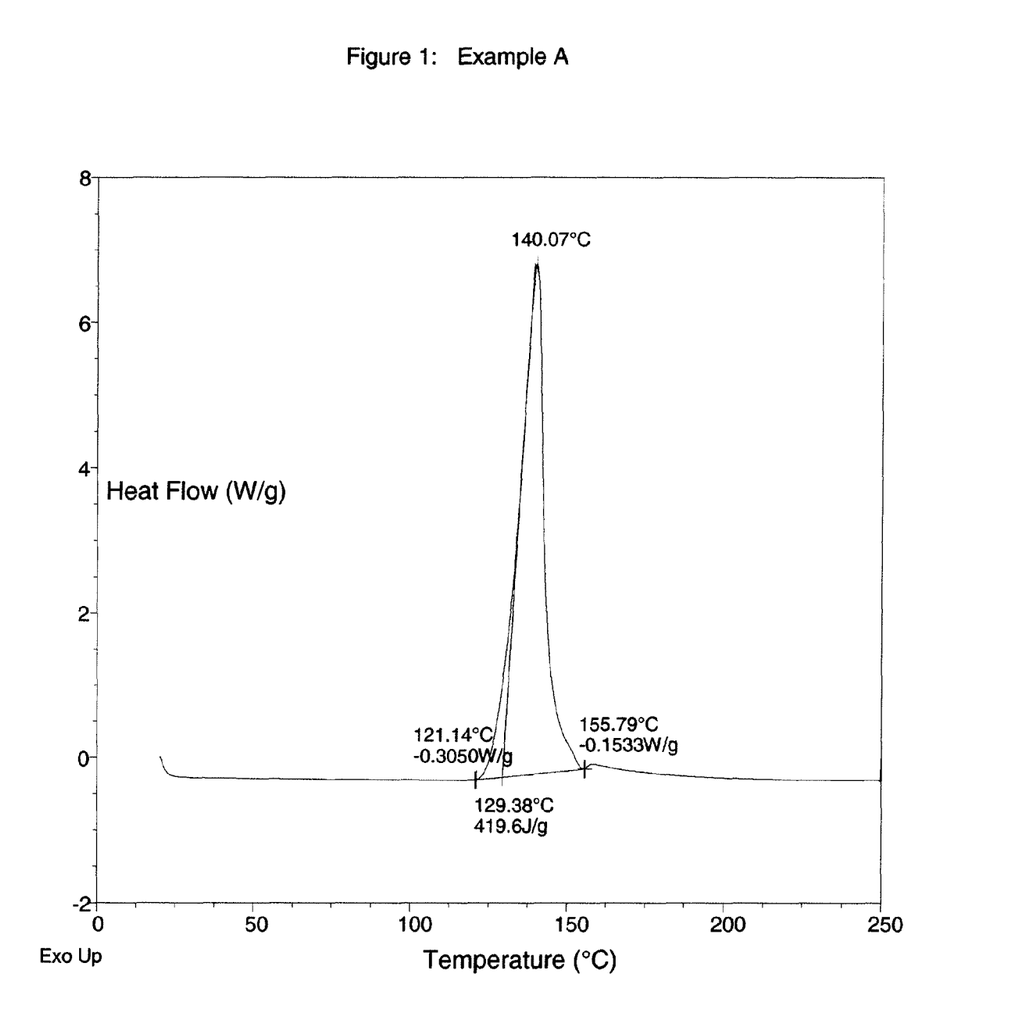
FIG. 1 is the differential scanning calorimeter cure profile of 1-(3-aminopropyl)imidazole-hexamethylene diisocyanate adduct.
Figure 2:
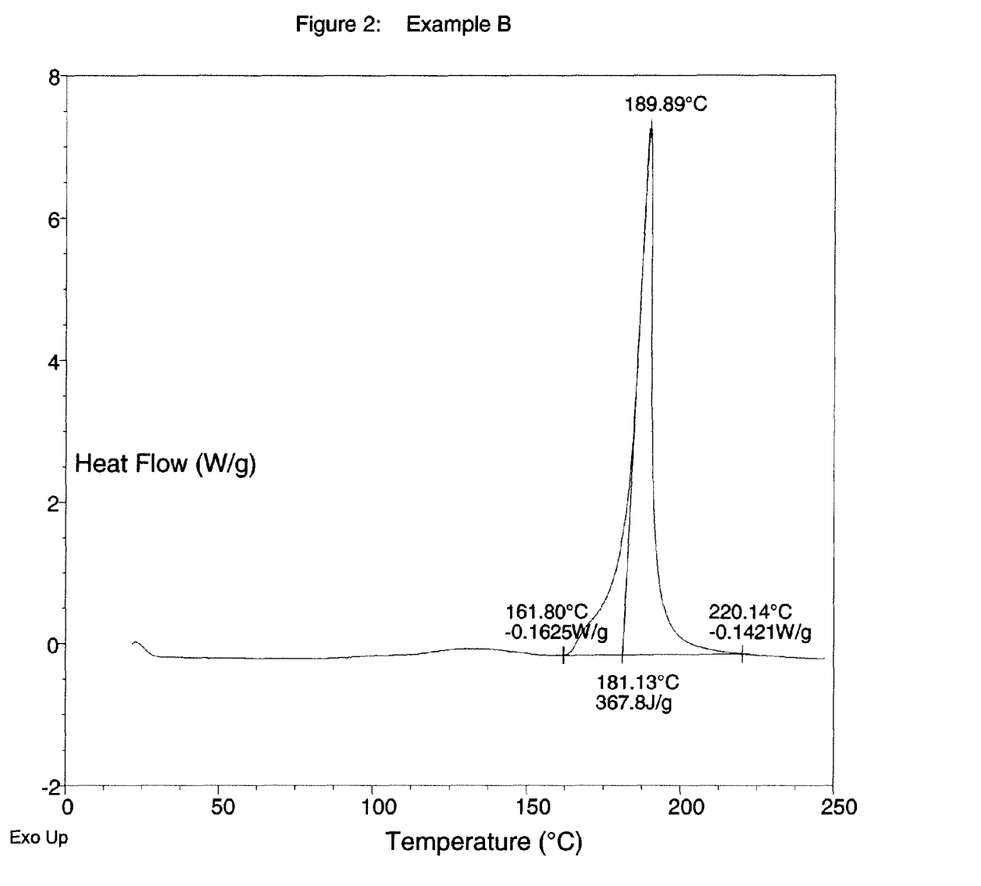
FIG. 2 is the differential scanning calorimeter cure profile of 1-(3-aminopropyl)imidazole-polymethylene poly(phenylisocyanate) adduct.
Figure 3:
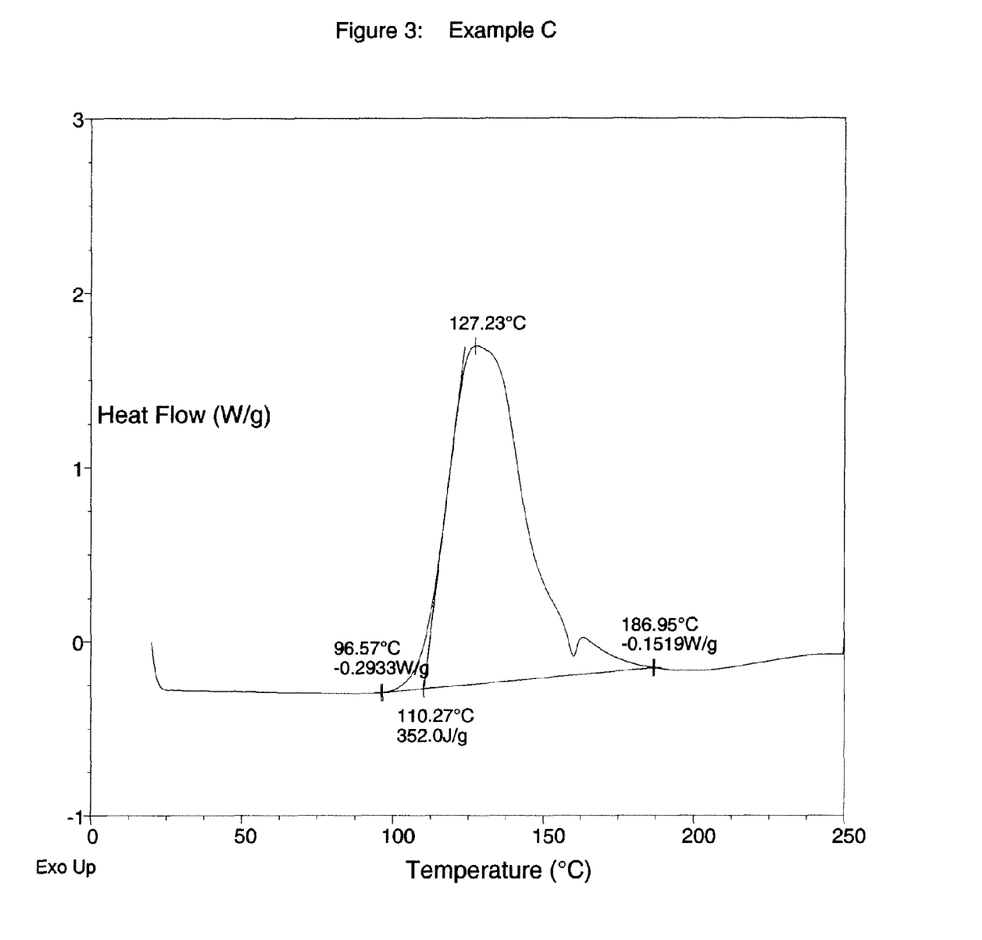
FIG. 3 is the differential scanning calorimeter cure profile of 1-(3-aminopropyl)imidazole-phenylisocyanate adduct.
Figure 4:
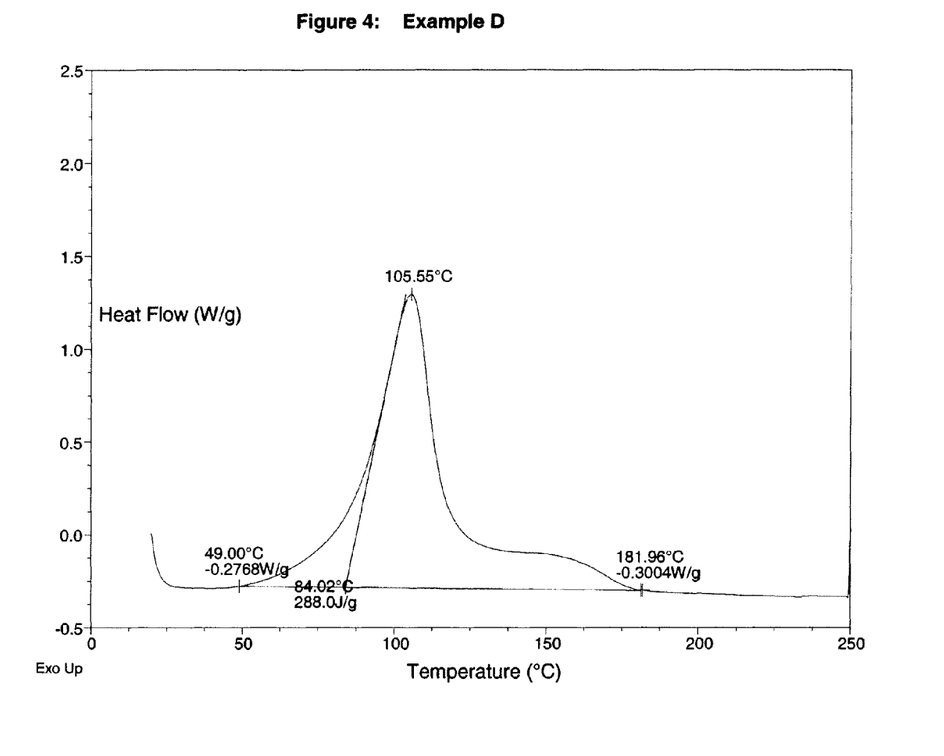
FIG. 4 is the differential scanning calorimeter cure profile of 1-(3-aminopropyl)imidazole-cyclohexyl isocyanate adduct.
Figure 5:
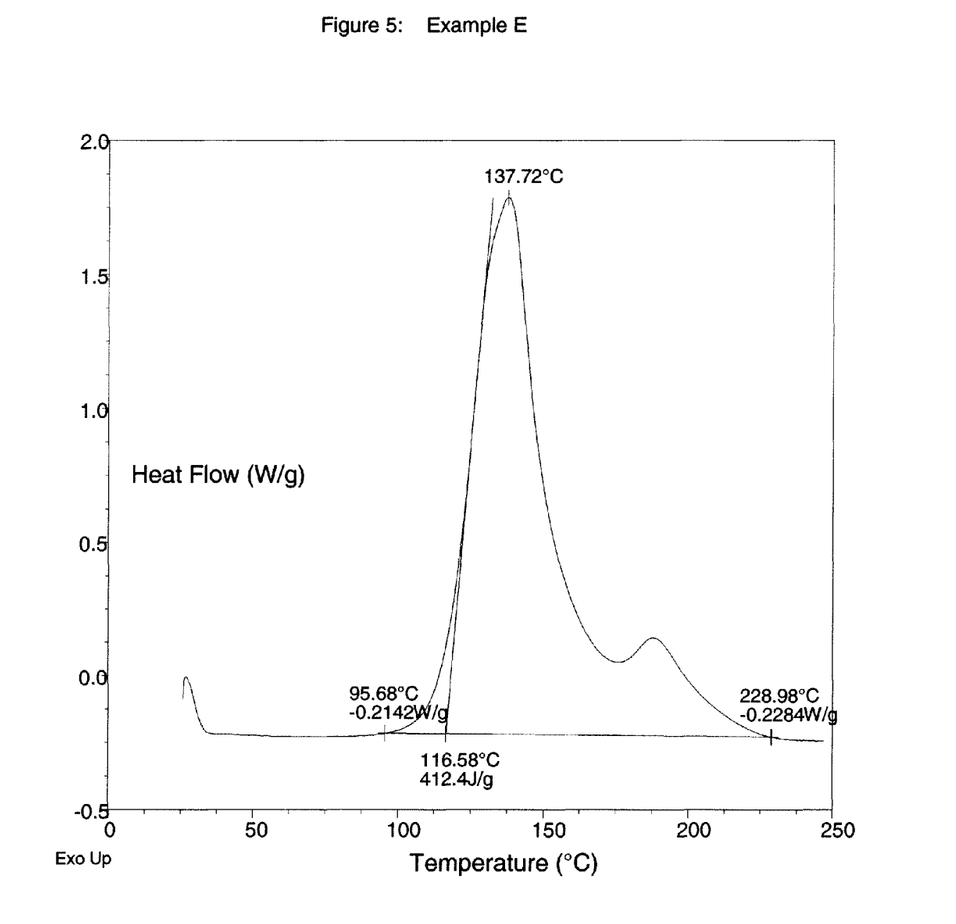
FIG. 5 is the differential scanning calorimeter cure profile of 1-(3-aminopropyl)imidazole-toluene diisocyanate adduct.
Figure 6:
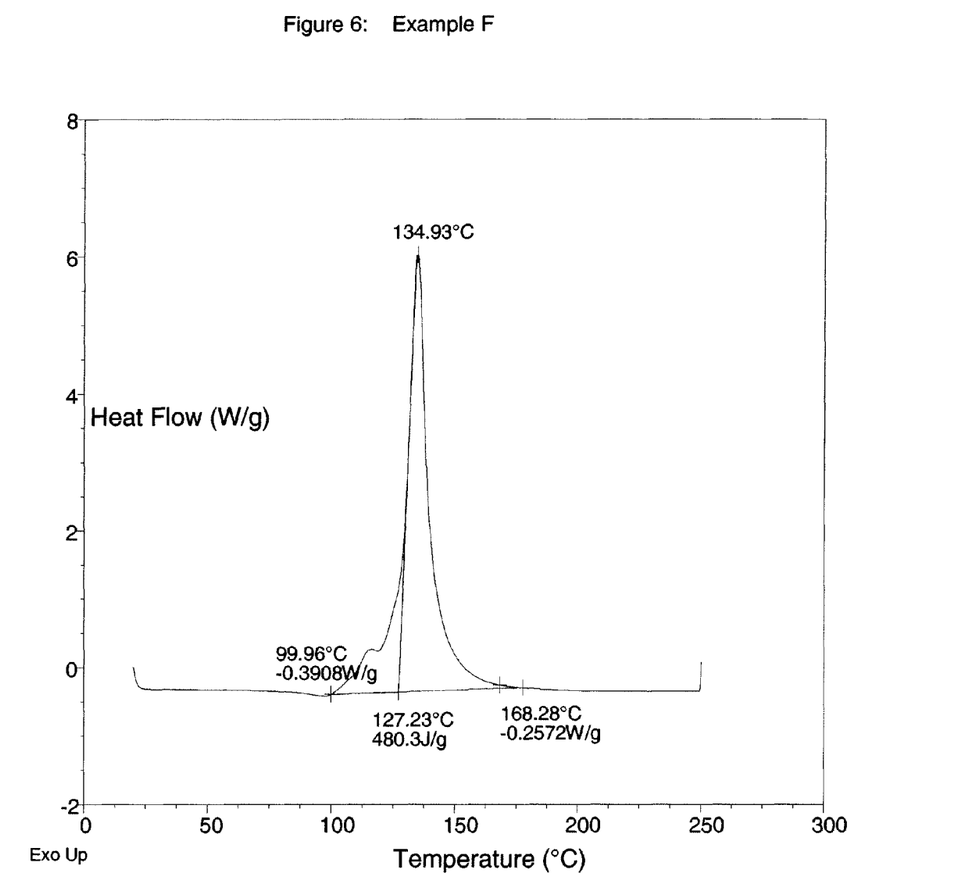
FIG. 6 is the differential scanning calorimeter cure profile of 2-ethyl-4-methyl imidazole-hexamethylene diisocyanate adduct.
Figure 7:
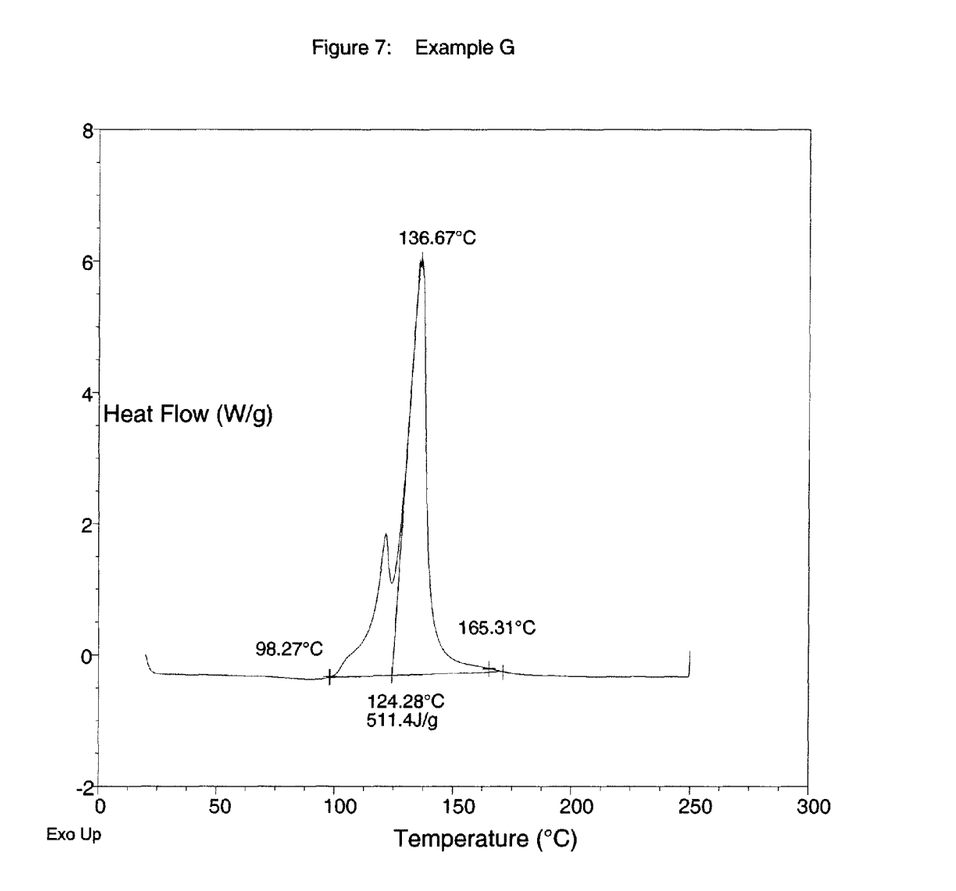
FIG. 7 is the differential scanning calorimeter cure profile of imidazole-hexamethylene diisocyanate adduct.
Figure 8:
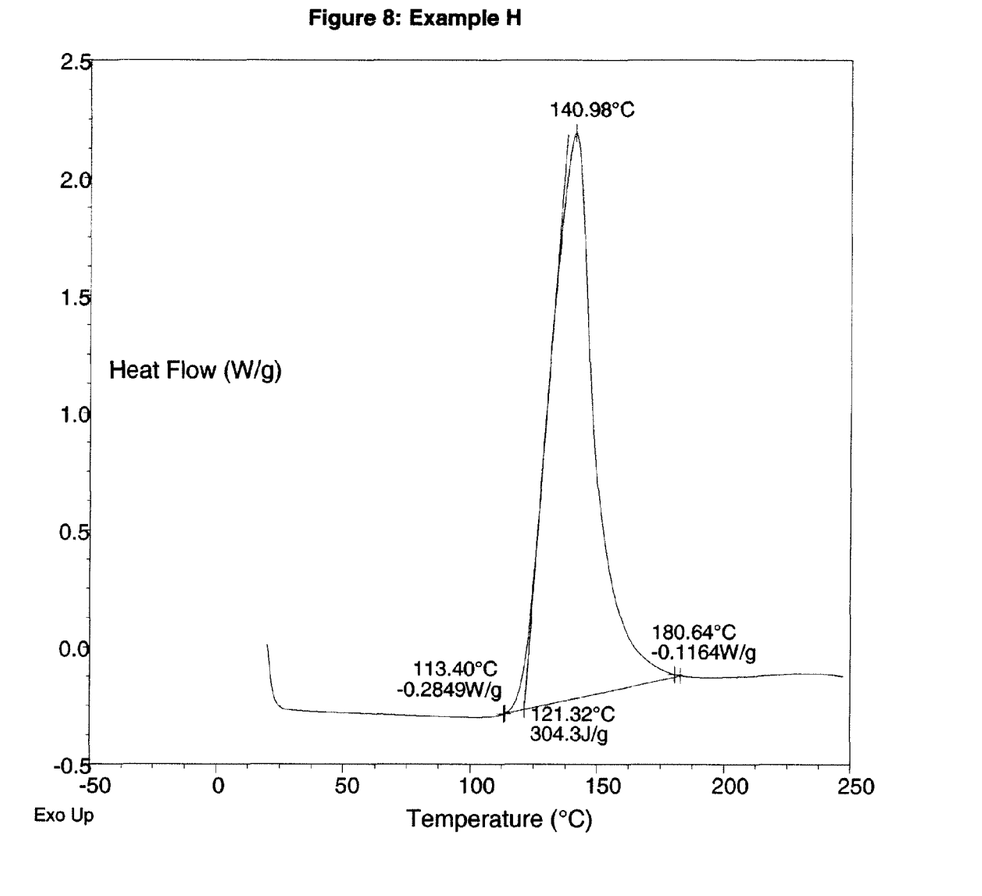
FIG. 8 is the differential scanning calorimeter cure profile of 1-(3-aminopropyl)imidazole-hexamethylene diisocyanate-1,6-hexanediamine adduct.
Figure 9:
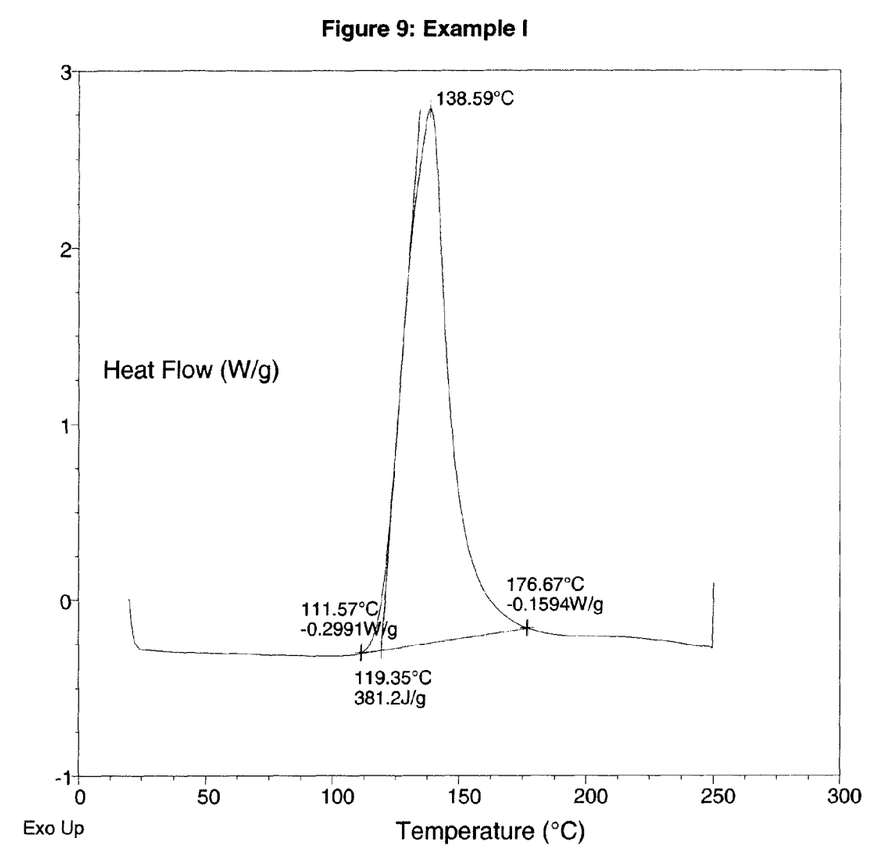
FIG. 9 is the differential scanning calorimeter cure profile of 1-(3-aminopropyl)imidazole-hexamethylene diisocyanate-1,6-hexanediamine-1,4-butanediamine adduct.

The 1-(3-aminopropyl)imidazole and its mixture with 1,6-hexanediamine and 1,4-butanediamine, the 2-ethyl-4-methyl-imidazole and the imidazole adducts obtained from hexamethylene diisocyanate were found to have a fast cure, or snap-cure profile at low temperature (e.g., 120-130° C.) and the 1-(3-aminopropyl)imidazole-polymethylene poly(phenylisocyanate) adduct had a fast cure, or snap cure, profile at high temperature (190° C.), as shown by their narrow peaks in FIGS. 1, 2, 6, 7, 8 and 9 which translate into a small difference between the start and the end of the exotherm (Tf–Ti). All other adducts exhibited a broad cure profile such as shown in FIGS. 3-5.

A fast cure, or snap-cure, profile is highly desirable in high volume applications where cycle time reduction and cost savings are important.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A curable epoxy composition comprising the contact product of at least one epoxy resin and an epoxy curing agent comprising an imidazole-isocyanate adduct which comprises a reaction product of at least one imidazole, at least one diamine, and at least one member selected from the group consisting of at least one polymethylene diisocyanate having 2-8 methylene units and at least one polymethylene poly(phenylisocyanate); wherein the imidazole-isocyanate adduct comprises an adduct represented by formula A:

where Z is $(CH_2)_n$—NH, p is 0-1 and n is 3-8, R is the polyvalent residue of polymethylene poly(phenylisocyanate) having an isocyanate functionality of 2.1-3.5; and $R_1$ and $R_2$ independently represent hydrogen, C1-C20 linear or branched alkyl, C6-C10 aryl, alkylaryl or arylalkyl; or C5-C6 cycloaliphatic.

2. The epoxy composition of claim 1 which is a 100% solids epoxy composition.

3. The epoxy composition of claim 1 which is an aqueous epoxy composition of 20 to 80 wt % solids.

4. The epoxy composition of claim 1 further comprising at least one accelerator.

5. A method for providing a fast cure profile in an epoxy composition which comprises heating and curing an epoxy composition of claim 4 in which the difference between the beginning (Ti) and end (Tf) of the exotherm is less than 70° C. as determined by DSC analysis.

6. A method for providing a fast cure profile in an epoxy composition which comprises heating and curing an epoxy composition of claim 1 in which the difference between the beginning (Ti) and end (Tf) of the exotherm is less than 70° C. as determined by DSC analysis.

7. A curable epoxy composition comprising the contact product of at least one epoxy resin and an epoxy curing agent comprising an imidazole-isocyanate adduct which comprises a reaction product of at least one imidazole, at least one diamine, and at least one member selected from the group consisting of at least one polymethylene diisocyanate having 2-8 methylene units and at least one polymethylene poly(phenylisocyanate); wherein the imidazole-isocyanate adduct comprises an adduct represented by formula:

$Z = (CH_2)_n$—NH   p = 0-1 wherein x=1-10, y=1-10, l is 2-10, m is 2-8 n is 3-8, q is 2-10, and R1, R2 and R3 independently represent hydrogen, C1-C20 linear or branched alkyl, C6-C10 aryl, alkylaryl or arylalkyl; or C5-C6 cycloaliphatic.

8. A curable epoxy composition comprising the contact product of at least one epoxy resin and an epoxy curing agent comprising an imidazole-isocyanate adduct which comprises a reaction product of at least one imidazole, at least one diamine, and at least one member selected from the group consisting of at least one polymethylene diisocyanate having 2-8 methylene units and at least one polymethylene poly(phenylisocyanate); wherein the imidazole-isocyanate adduct comprises an adduct represented by formula:

-continued

Z = (CH$_2$)$_n$—NH   p = 0-1 wherein x=1-10, y=1, l is 2-10, n is 3-8, q is 2-10, R is (CH$_2$)$_m$ and m is 2-8 or the polyvalent residue of polymethylene poly(phenylisocyanate) having an isocyanate functionality of 2.1-3.5; and R1, R2 and R3 independently represent hydrogen, C1-C20 linear or branched alkyl, C6-C10 aryl, alkylaryl or arylalkyl; or C5-C6 cycloaliphatic.

9. A curable epoxy composition comprising the contact product of at least one epoxy resin and an epoxy curing agent comprising an imidazole-isocyanate adduct which comprises a reaction product of at least one imidazole, at least one diamine, and at least one member selected from the group consisting of at least one polymethylene diisocyanate having 2-8 methylene units and at least one polymethylene poly(phenylisocyanate); wherein the diamine comprises 1,6-hexanediamine.

10. A curable epoxy composition comprising the contact product of at least one epoxy resin and an epoxy curing agent comprising an imidazole-isocyanate adduct which comprises a reaction product of at least one imidazole, at least one diamine, and at least one member selected from the group consisting of at least one polymethylene diisocyanate having 2-8 methylene units and at least one polymethylene poly(phenylisocyanate); wherein the diamine comprises 1,4-butanediamine.

11. A curable epoxy composition comprising the contact product of at least one epoxy resin and an epoxy curing agent comprising an imidazole-isocyanate adduct which comprises a reaction product of at least one imidazole, at least one diamine, and at least one member selected from the group consisting of at least one polymethylene diisocyanate having 2-8 methylene units and at least one polymethylene poly(phenylisocyanate); wherein the member comprises polymethylene poly(phenylisocyanate) having an isocyanate functionality of 2.1-3.5.

* * * * *